US 9,990,281 B1

(12) United States Patent
Booss et al.

(10) Patent No.: US 9,990,281 B1
(45) Date of Patent: Jun. 5, 2018

(54) MULTI-LEVEL MEMORY MAPPING

(71) Applicant: SAP SE, Walldorf (DE)

(72) Inventors: Daniel Booss, Angelbachtal (DE); Ivan Schreter, Malsch (DE); Robert Kettler, Heidelberg (DE)

(73) Assignee: SAP SE, Walldorf (DE)

( * ) Notice: Subject to any disclaimer, the term of this patent is extended or adjusted under 35 U.S.C. 154(b) by 10 days.

(21) Appl. No.: 15/363,516

(22) Filed: Nov. 29, 2016

(51) Int. Cl.
*G06F 12/00* (2006.01)
*G06F 12/02* (2006.01)

(52) U.S. Cl.
CPC .. *G06F 12/0292* (2013.01); *G06F 2212/1016* (2013.01)

(58) Field of Classification Search
None
See application file for complete search history.

(56) References Cited

U.S. PATENT DOCUMENTS

| 2006/0004897 A1* | 1/2006 | Nadj | G06F 7/22 |
| 2012/0209855 A1* | 8/2012 | Shinjo | G06F 17/30625 |
| | | | 707/745 |
| 2014/0136881 A1* | 5/2014 | Vasseur | H04L 41/145 |
| | | | 714/4.11 |

* cited by examiner

*Primary Examiner* — Brian Peugh
(74) *Attorney, Agent, or Firm* — Mintz Levin Cohn Ferris Glovsky and Popeo, P.C.

(57) ABSTRACT

A system for memory allocation and deallocation with a multi-level memory map is provided. In some implementations, the system performs operations comprising allocating a memory map for addressing a plurality of memory locations in a heap, the memory map comprising a root node, one or more second-level nodes, and a plurality of third-level nodes. The plurality of third-level nodes can comprise third entries for pointing to the memory locations and/or the one or more second-level nodes can comprise a plurality of second entries corresponding to the plurality of third-level nodes. The operations can further include determining a location to store data within the heap and/or tracking the location by placing a pointer within a third-level node of the plurality of third-level nodes and incrementing a counter corresponding to the third-level node. Related systems, methods, and articles of manufacture are also described.

20 Claims, 6 Drawing Sheets

MULTI-LEVEL MEMORY MAPPING

FIELD

The subject matter disclosed herein relates to methods and apparatus for, among other things, memory allocation and deallocation with a multi-level memory map.

BACKGROUND

In operation, computing systems often allocate data to various memory locations dynamically and/or randomly. Multi-level memory maps can be used to keep track of and/or reference a large number of memory locations. However, as data is added to memory and/or entries are added to the map, unused data may continue to take up space in the memory/map. Therefore, it may be desirable to provide systems and/or methods for memory allocation and deallocation with a multi-level memory map.

SUMMARY

In one aspect, a method, computer program product and system are provided. The method, computer program product and system execute operations for memory allocation and deallocation with a multi-level memory map. In one variation, the operations can include allocating a memory map for addressing a plurality of memory locations in a heap, the memory map comprising a root node, one or more second-level nodes, and a plurality of third-level nodes. The plurality of third-level nodes can comprise third entries for pointing to the memory locations and/or the one or more second-level nodes can comprise a plurality of second entries corresponding to the plurality of third-level nodes. The operations can further include determining a location to store data within the heap and/or tracking the location by placing a pointer within a third-level node of the plurality of third-level nodes and incrementing a counter corresponding to the third-level node. The counter can be stored within a second entry of the plurality of second entries. One or more of the operations can occur at or by a database server.

In some variations the operations can further include determining that the data no longer needs to be stored, removing the pointer from the memory map, decrementing the counter, and/or deallocating the third-level node when the counter reaches zero. In some variations the operations can further include adding, to a list of free nodes, a reference to the third-level node after the deallocating, and/or determining a second location to store second data within the heap, wherein determining the second location comprises consulting the list of free nodes. In some aspects, a second-level node can include the second entry and/or the operations can further include decrementing, when the third-level node is deallocated, a second counter corresponding to the second-level node and stored at the root node, and/or deallocating the second-level node when the second counter reaches zero.

In some variations the operations can further include determining a second location to store second data within the heap, determining whether the memory map is capable of addressing the second location, and/or allocating one or more additional third-level nodes and/or one or more additional second-level nodes when the memory map is not capable of addressing the second location. In some aspects, the one or more additional third-level nodes and/or the one or more additional second-level nodes can be allocated. In related aspects, the operations can further include storing, at the root node, one or more pointers to the one or more additional second-level nodes, incrementing, at the root node, one or more counters corresponding to the one or more additional second-level nodes, storing, at the one or more additional second-level nodes, one or more pointers to the one or more additional third-level nodes, and/or incrementing, at the one or more additional second-level nodes, one or more counters corresponding to the one or more additional third-level nodes.

In some implementations, each of the one or more second-level nodes can address eight gigabytes of memory in the heap, each of the plurality of third-level nodes can address four megabytes of memory in the heap, and/or each of the plurality of memory locations can be four kilobytes. In some variations the operations can further include monitoring a handle for the location, determining that the handle has been released, and/or decrementing the counter. In some implementations, the plurality of second entries can include space for a pointer to a corresponding third-level node and a counter for a number of the third entries which are in use within the corresponding third-level node. The root node can comprise one or more first entries corresponding to the one or more second-level nodes and/or the one or more first entries can include space for a pointer to a corresponding second-level node and a counter for a number of the second entries which are in use within the corresponding second-level node.

Implementations of the current subject matter can include, but are not limited to, systems and methods consistent with the present description, including one or more features as described, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

Where practical, like labels are used to refer to the same or similar items in the figures.

DETAILED DESCRIPTION

As noted above, memory can be dynamically and/or randomly allocated. The portion of memory which is used for dynamic/random allocation can be referred to as a heap. A page table is a data structure which can hold data/metadata about portions of the heap. The data and/or metadata can vary depending on the scenario. In some implementations, information about usage and/or sizes of allocated and/or free blocks can be stored, which can be used for memory management. However, once memory blocks are allocated, it may be difficult to deallocate the blocks, which may ultimately remain allocated, which can waste space in the heap/memory. As such, systems and methods for memory allocation and deallocation with a multi-level memory map are provided herein.

Figure 1:
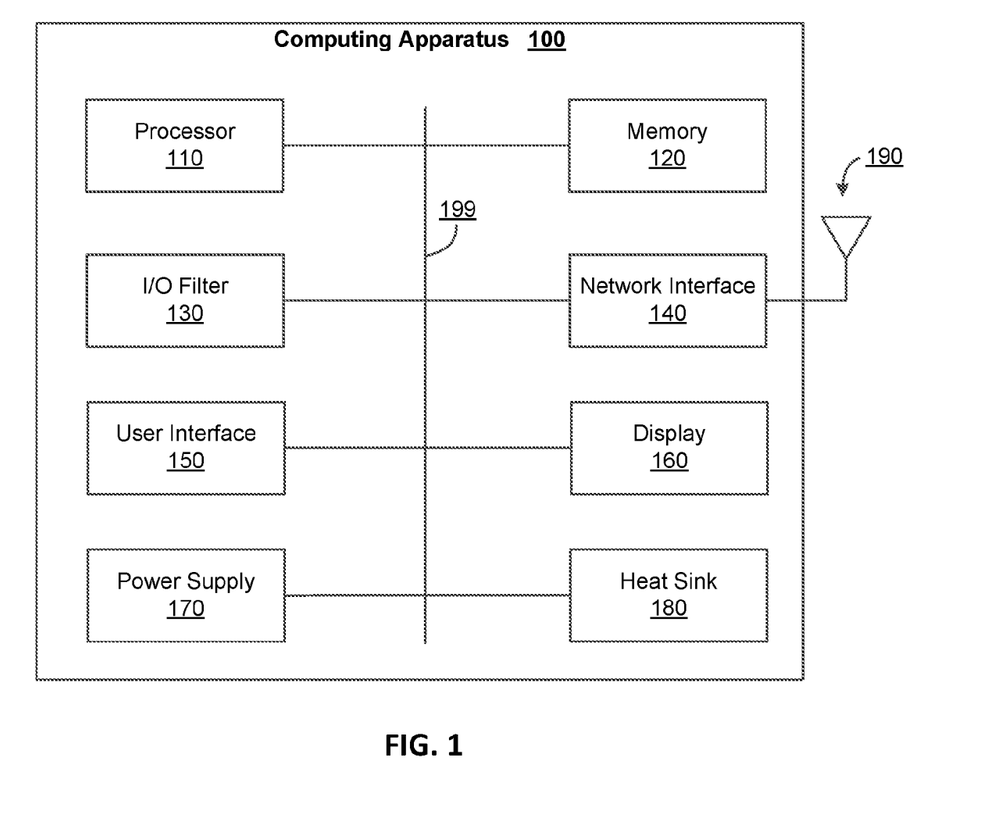
FIG. 1 illustrates a functional block diagram of a computing apparatus for implementing features consistent with the described subject matter, in accordance with some example implementations.

FIG. 1 illustrates an example computing apparatus 100 which may be used to implement one or more of the described devices and/or components, in accordance with some example implementations. Similarly, at least a portion of the computing apparatus 100 may perform one or more of the methods/operations described herein.

As illustrated, computing apparatus 100 may include one or more processors such as processor 110 to execute instructions that may implement operations consistent with those described herein. Apparatus 100 may include memory 120 to store executable instructions, code, data, and/or other information. Memory 120 may include solid-state memory, solid-state disk drives, magnetic disk drives, or any other information storage device. Apparatus 100 may include one or more network interfaces, such as network interface 140, which can be configured to communicate over wired networks and/or wireless networks. Wireless networks may include WiFi, WiMax, Bluetooth, and cellular networks (2G/3G/4G/5G), and/or any other wireless networks. In order to effectuate wireless communications, the network interface 140, for example, may utilize one or more antennas, such as antenna 190.

Apparatus 100 may include one or more user interface, such as user interface 150. The user interface 150 can include hardware or software interfaces, such as a keyboard, mouse, or other interface, some of which may include a touchscreen integrated with a display 160. In various implementations, the user interface 150 can include one or more peripheral devices and/or the user interface 150 may be configured to communicate with these peripheral devices.

The apparatus 100 may also comprise an input and output filter 130, which can filter information received from and/or transmitted to a user interface 150, a network interface 140, and/or the like. The apparatus 100 may be powered through the use of one or more power sources, such as power source 170, which can rely on wired and/or wireless power techniques. One or more of the components of the apparatus 100 may be cooled through the use of one or more heat sinks, such as heat sink 180. As illustrated, one or more of the components of the apparatus 100 may communicate and/or receive power through a system bus 199.

In some implementations, the computing apparatus 100 can be used to implement at least a portion of a database management system. In some aspects, a database management system may be a hardware and/or software system for receiving, handling, optimizing, and/or executing database queries. In some aspects, a database, as referred to herein, can be a structured, organized collection of data, such as schemas, tables, queries, reports, views, and/or the like, which may be processed for information. A database may be physically stored in a hardware server or across a plurality of hardware servers. In some aspects, a database management system may be a hardware and/or software system that interacts with a database, users, and/or other software applications for defining, creating, updating the structured data, and/or for receiving, handling, optimizing, and/or executing database queries.

For example, the computing apparatus 100 can provide one or more features of a high-level programming software system or other software that includes database management features. The computing apparatus 100 can also aggregate or otherwise provide a gateway via which users can access functionality provided by one or more external software components. One or more client machines can access the computing apparatus 100, either via a direct connection, a local terminal, over a network (e.g. a local area network, a wide area network, a wireless network, the Internet, or the like), and/or the like.

The computing apparatus 100 can be configured to access a database that includes at least one table, which can in turn include at least one column. The database table can store any kind of data, potentially including but not limited to definitions of scenarios, processes, and one or more configurations as well as transactional data, metadata, master data, and/or the like relating to instances or definitions of the scenarios, processes, configurations, concrete instances of structured data, such as objects that are relevant to a specific instance of a scenario or a process, and/or the like. The database can be external to the computing apparatus 100 or may be part of the computing apparatus 100 (e.g., at least partially stored in the memory 120). In some aspects, the memory 120 may be utilized to store at least a portion of a database and/or function as an in-memory database.

For example, a processor 110, a network interface 140, and/or a user interface 150 may be configured to receive and/or load a database table or other comparable data set, into the memory 120. The processor 110, network interface 140, and/or user interface 150 can be further configured to provide information back to the database and/or to a user. Receiving and/or transmitting data can be based on receipt of a query instantiated by a user or computer system through one or more client machines, external software components, core software platforms, and/or the like.

Figure 2:
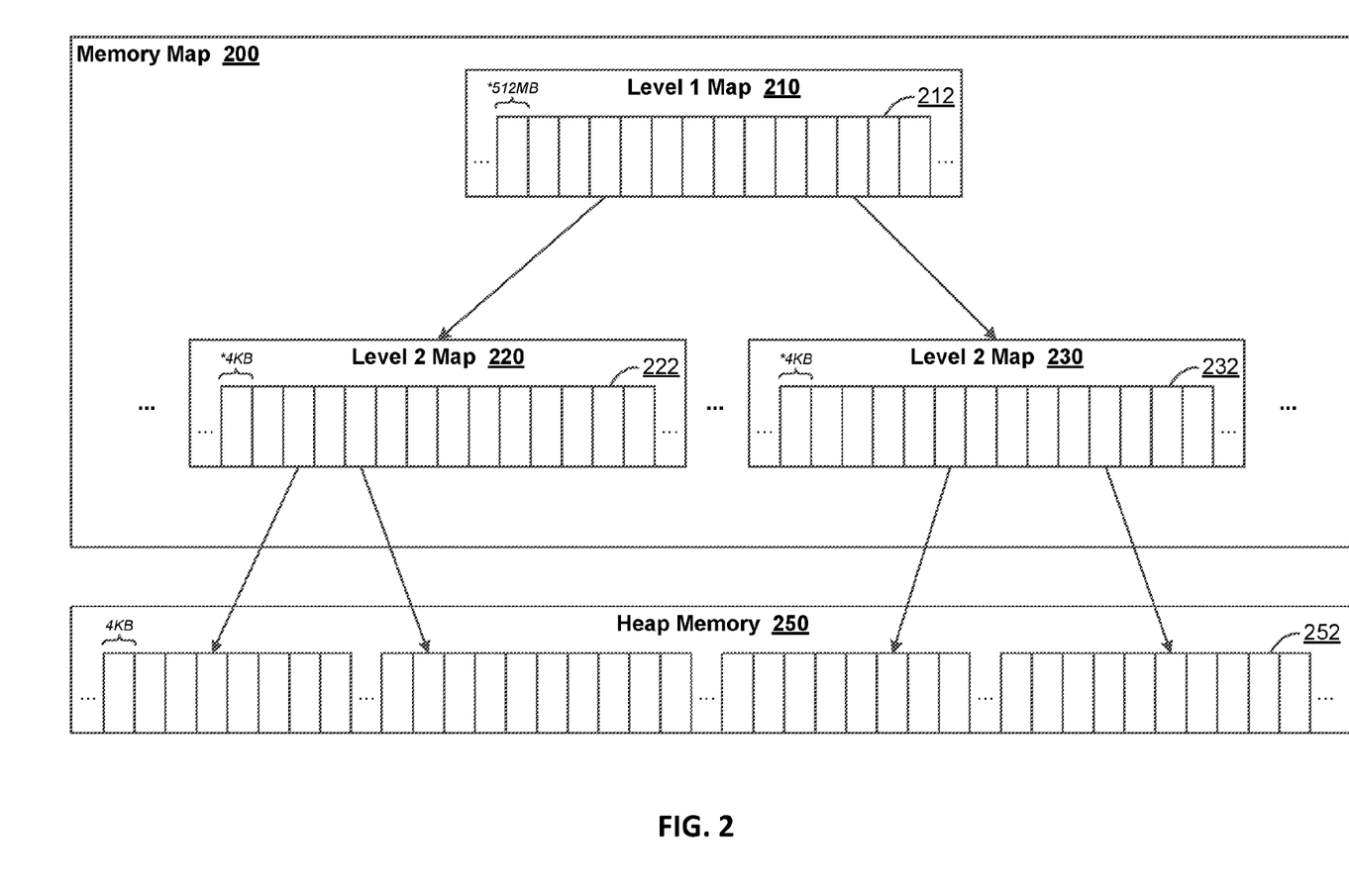
FIG. 2 illustrates a functional block diagram of a multi-level memory map, in accordance with some example implementations.

FIG. 2 illustrates a functional block diagram of a multi-level memory mapping 200, in accordance with some example implementations. As illustrated, the memory mapping 200 can be a tree-like hierarchical structure with a root/parent node, such as a first level map 210, and a plurality of branch/child nodes, such as a plurality of second level maps 220, 230. In some aspects, memory mappings can be referred to as "page tables." The memory mapping 200 can be used to address a plurality of memory locations in a heap, such as the memory locations 252 of the heap memory 250. In some implementations, a memory address can be used to address a memory location 252, where portions of the address correspond to locations in the first level map 210 (e.g., a first part of the memory address) and/or locations in the plurality of second level maps 220, 230 (e.g., a second part of the memory address). The length of the address can depend upon the software/hardware used to store/access/maintain the memory mapping 200 and/or the sizes of the first level map 210 and the second level maps 220, 230. For example, the memory address can be forty-eight bits (or forty-seven bits with a one bit indication). At least a portion of the memory mapping 200 and/or the heap memory 250 can be included within the memory 120. In some aspects, the memory mapping 200 (e.g., the first level map 220 and/or the plurality of second level maps 220, 230) can be included within a separate portion of the memory 120 than the heap memory 250.

The first level map 210 can be the highest level map, and may be used to address the entire heap memory 250. However, instead of pointing directly to each memory location 252 within the heap memory, each entry 212 of the first level map 210 can point to a second level map 220, 230. In turn, each of the entries 222 within the second level map 220 can point to a memory location 252 and/or each of the entries 232 within the second level map 230 can point to a memory location 252. Thus, the first level map 220 and/or the plurality of second level maps 220, 230 can be used in combination to address every memory location 252 within the heap memory 250. In some aspects, the entries 232 can be regarded as leaf nodes, which may be known as "Block-Info" data structures.

The size of each of the first level map 220, its entries 212, the plurality of second level maps 220, 230, their respective entries 222, 232, the heap memory 250, and/or the memory locations 252 can vary from one implementation to another. For example, as illustrated, the first level map 210 can include entries 212 which address 512 MB of memory within the heap memory 250. Thus, in turn, each of the plurality of second level maps 220, 230 may address 512 MB of memory locations 252. As further illustrated, each of the memory locations 252 can be 4 KB. Thus, each of the entries 222, 232 of the second level maps 220, 230 can be used to address corresponding 4 KB portions of memory.

Using a first level map 210 with $2^{19}$ entries 212 can allow for up to $2^{19}$ second level maps 220, 230. Using second level maps 220, 230 with $2^{17}$ entries 222, 232 each can allow each of the second level maps 220, 230 to address up to $2^{17}$ memory locations 252 (e.g., 512 MB to address $2^{17}$ 4 KB locations). In combination, the $2^{19}$ entries 212 multiplied with the $2^{17}$ entries 222, 232 can be used to address a memory space of up to $2^{36}$ memory locations 252. If each of the memory locations 252 is 4 KB, then the mapping of FIG. 2 can be used to address approximately 256 TB of heap memory 250. However, certain implementations can allow for a memory address that is up to forty-eight bits in length (or forty-seven bits with a one bit indication). Thus, more or less memory locations 252 can be addressed by altering the size of the space addressed by and/or the number of the entries 212 in the first level map 210 and/or the entries 222, 232 in the second level maps 220, 230.

In some aspects, at least a portion of the plurality of second level maps 220, 230 can take up approximately 2 MB-4 MB of memory. As more data is allocated into the memory locations 252, the memory mapping 200 can continue to expand to keep track of this information. However, in some implementations, the second level maps 220, 230 may continue to keep track of this information, even though corresponding memory locations 252 are no longer being accessed (e.g., the information may persist until a program which previously accessed the tracked memory locations 252 terminates). Thus, if the maximum number of second level maps 220, 230 were used, the memory mapping 200 could take up approximately 256 GB to 512 GB.

In some aspects, poor fragmentation can lead to this increase in wasted space. For example, if two 1 KB non-concurrent portions (e.g., separated by at least one other portion between) of a memory location 252 are already allocated/reserved, and 2 KB of concurrent memory needs to be allocated, then another, separate memory location 252 will need to be used/allocated, increasing the overall size of the memory locations 252 which need to be addressed. In some aspects, this could require the creation of another second level map 220, 230. Further, even when occupied memory locations 252 are no longer needed, the metadata may stay in memory 250 as long as the program executes. Additionally, even if a second level map 220, 230 is capable of releasing its pointers to memory locations 252, it may not be able to be released from memory itself until 512 MB (or whatever the size of the heap memory 250 addressed by the second level map 220, 230) of consecutive free blocks with correct alignment to be released. As such, systems and methods for reducing the amount of space occupied by a memory map are described herein.

Figure 3:
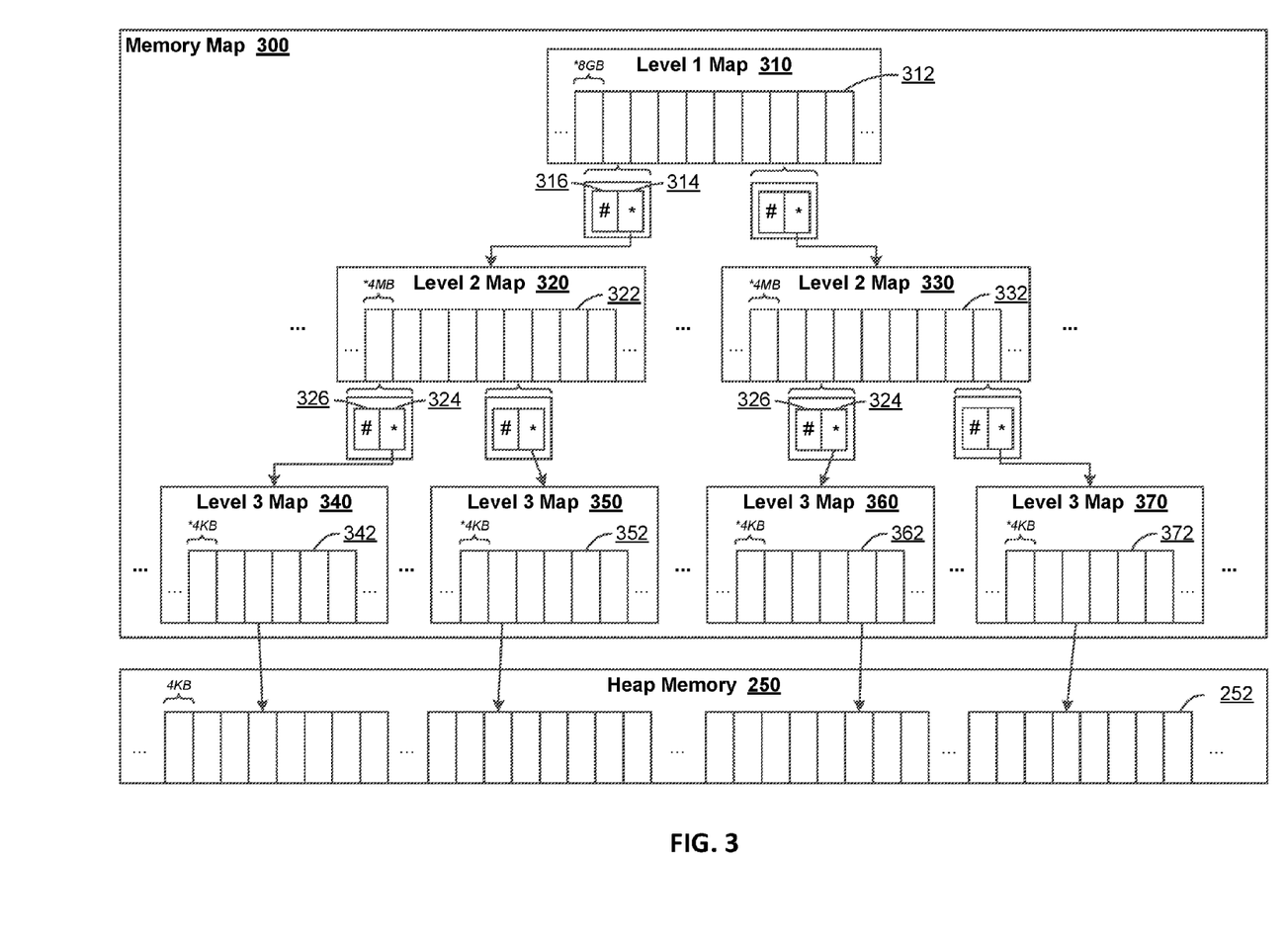
FIG. 3 illustrates another functional block diagram of a multi-level memory map, in accordance with some example implementations.

FIG. 3 illustrates another functional block diagram of a multi-level memory mapping 300, in accordance with some example implementations. As illustrated, a three-level memory mapping 300 can be used to address the heap memory 250, instead of the two-level memory mapping 200 of FIG. 2. At least a portion of the three-level memory mapping 300 and/or the heap memory 250 can be stored within the memory 120. Additionally, at least a portion of the three-level memory mapping 300 and/or the heap memory 250 can be stored within different portions of the memory 120. As illustrated, the memory mapping 300 can include a first level map 310, a plurality of second level maps 320, 330, and/or a plurality of third level maps 340, 350, 360, 370. As above, the size of each of the maps and/or the space each map addresses can vary based on the implementation.

In some implementations, the first level map 310 can include a plurality of entries 312 which each address 8 GB worth of data. In some aspects, there may be $2^{14}$ entries 312 within the first level map 310, which can allow for addressing approximately 128 TB of memory locations. In some implementations, each of the entries 312 can include a data structure storing a pointer 314 to a second level map 320, 330 and/or a counter 316 for tracking the number of accesses to the corresponding second level map 320, 330 addressed by the entry 312. In some aspects, the pointer 314 and/or the counter 316 may only be changed (e.g., together) though atomic operations.

In some implementations, the plurality of second level maps 320, 330 can include a plurality of entries 322, 332 which each address 4 MB worth of data. As illustrated, the 4 MB of data can be addressed through a third level map 340, 350, 360, 370. In some aspects, there may be $2^{11}$ entries 322, 332 in each of the plurality of second level maps 320, 330. Accordingly, there can be up to $2^{11}$ third level maps 340, 350, 360, 370. Similar to the first level map 310, each of the entries 322, 332 in the second level maps 320, 330 can include a data structure storing a pointer 324, 334 to a third level map 340, 350, 360, 370 and/or a counter 326, 336 for tracking the number of accesses to the corresponding third level map 340, 350, 360, 370 addressed by the entry 322, 332. In some aspects, the pointers 324, 334 and/or the counters 326, 336 may only be changed (e.g., together) though atomic operations. Atomic operations can include operations acting on shared memory/variables that complete in a single step relative to other threads, which can provide for uninterruptable/isolated changes of important information.

As illustrated, each of the entries 342, 352, 362, 372 in the third level maps 340, 350, 360, 370 can address 4 KB of memory (e.g., one 4 KB memory location 252 in the heap memory 250). In some aspects, each of the third level maps 340, 350, 360, 370 can include up to $2^{10}$ entries 342, 352, 362, 372. Although not illustrated, in some implementations, each of the entries 342, 352, 362, 372 can include a data structure storing a pointer to a memory location 252 and/or an indication for tracking whether the corresponding memory location 252 addressed by the entry 342, 352, 362, 372 is being accessed. Based on some combination of the various counters/indications tracked by the memory mapping 300, the memory mapping 300 can determine whether memory may be deallocated, which can save on wasted space.

Figure 4:
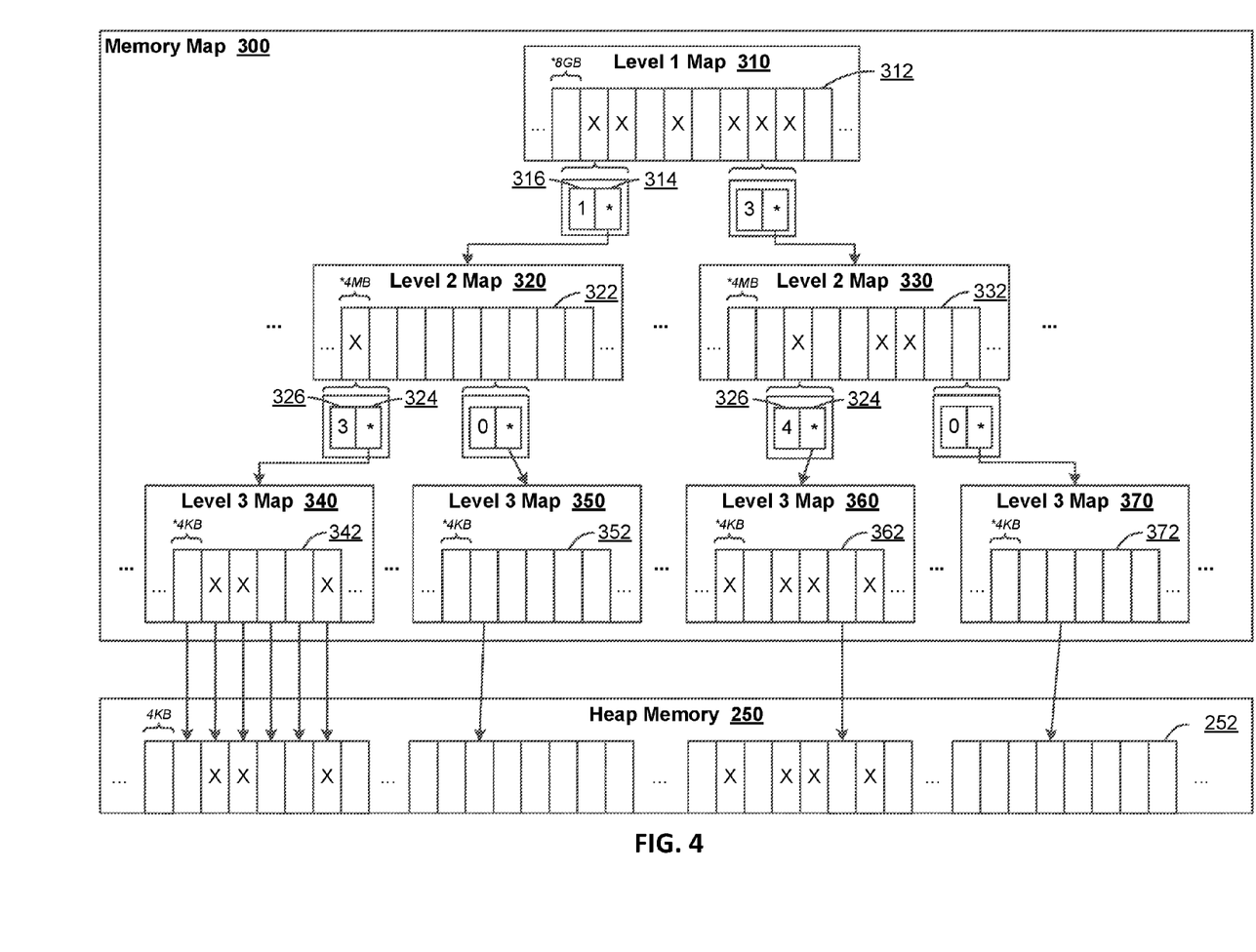
FIG. 4 illustrates another functional block diagram of a multi-level memory map, in accordance with some example implementations.

FIG. 4 illustrates another functional block diagram of the multi-level memory map 300 of FIG. 3, in accordance with some example implementations. As illustrated, a plurality of the data locations 252 may be presently in use (e.g., used for storage of data by an application/program), as indicated by the 'X's. As illustrated, indications of whether one or more data locations 252 addressed by the third level map 340, for example, are in use can be tracked by an entry 342 corresponding to the data location 252. As each entry 342 can correspond to one data location 252, this indication can be binary. The second level map 320 which references the third level map 340 can keep track, through the use of the counter 326, of the number of data locations 252 in use which are addressed by the third level map 340. For example, as illustrated, three data locations 252 addressed by the third level map 340 may currently be in use, so the value of the counter 326 may be equal to three. The other third level maps 350, 360, 370 can track the use of memory locations which they address in a similar manner. For example, a counter 326 corresponding to the third level map 350 can be equal to zero (as none of the referenced data locations 252 are in use in the illustrated implementation), a counter 326 corresponding to the third level map 360 can be equal to four, and/or a counter 326 corresponding to the third level map 370 can be equal to zero.

The second level maps 320 can operate in a similar manner. For example, as illustrated, the second level map 320 may only have one entry 322 which is in use (e.g., the entry 322 corresponding to the third level map 340). This can be tracked through the use of the counter 316 corresponding to the second level map 320, which is maintained by the first level map 310.

In some aspects, a data location 252, a third level map 340, 350, 360, 370, and/or a second level map 320, 330, can be determined to be in used when it is accessed by/through a program. For example, if a program references a data location 252 through the memory mapping 300, an address used to access the data location 252 can be analyzed to locate the data location and/or store information regarding the access.

Figure 5:
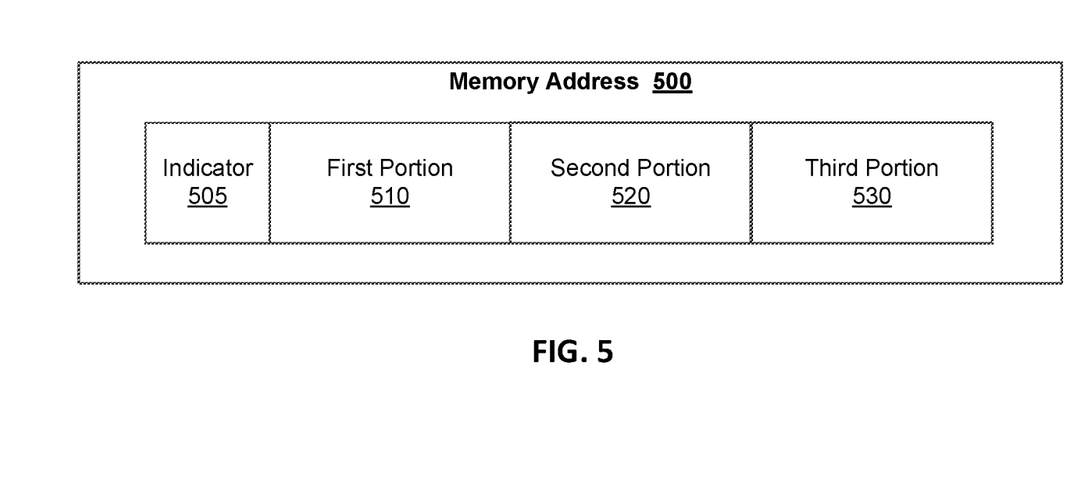
FIG. 5 illustrates a structure of a memory address for use with a multi-level memory map, in accordance with some example implementations.

For example, as illustrated in FIG. 5, a memory address 500 can contain an indicator 505, a first portion 510 for identifying a second level map 320, 330, a second portion 520 for identifying a third level map 340, 350, 360, 370 (e.g., within a corresponding second level map 320, 330), and/or a third portion for identifying a memory location 252 (e.g., within a corresponding third level map 340, 350, 360, 370). In some aspects, if there are $2^{14}$ entries within the first level map 310, then the first portion 510 can be fourteen bits in length to identify all possible second level maps 320, 330. Similarly, if there are $2^{11}$ entries within each of the second level maps 320, 330, then the second portion 520 can be eleven bits in length to identify all possible third level maps 340, 350, 360, 370. Further, if there are $2^{10}$ entries 342, 352, 362, 372 within each of the third level maps 340, 350, 360, 370, then the third portion 530 can be ten bits in length to identify all possible data locations 252. In total, the memory address 500 can be forty eight bits, the length of each of the first portion 510, the second portion 520, and/or the third portion 530 can be longer or shorter, and/or additional information can be present within the memory address 500. For example, four level mappings, five level mappings, etc. can be used, and the memory address 500 can contain a plurality of bits for this purpose.

Referring back to FIG. 4, in some aspects, the first level map 310 can increase a counter 316 corresponding to a second level map 330, for example, each time the first portion 510 of a memory address 500 addresses the second level map 330. In turn, the second level map 330 can increase a counter 326 corresponding to a third level map 360, for example, each time the second portion 520 of the memory address 500 addresses the third level map 330. Similarly, the third level map 360 can store an indication (e.g., and "in use" indication) corresponding to a memory location 252 when the third portion 530 of the memory address 500 addresses the memory location 252. Additionally or alternatively from the indication in the third level map 360, a pointer generated and/or stored within a corresponding entry 362 can be used to indicate whether the memory location 252 is in use. For example, if a pointer is stored in an entry 362, then this can indicate that the memory location 252 which the pointer points to is in use if pointers are removed from memory when the memory location 252 is no longer in use. In some aspects, when a particular memory location is referenced/accessed, the memory mapping 300 (or some other procedure/storage) can use a handle to keep track of this. In some implementations, pointers and/or integers can be used as handles. In some variations, handles can be maintained externally from the memory mapping 300 and/or the memory mapping 300 can be informed when a particular memory location 252 is in use, based on the handles. When a memory location 252 becomes free (e.g., no longer used by a program), then a corresponding handle can be released. When a handle is released, the memory mapping 300 can update the counters and/or pointers within the first level map 310, the relevant second level map 320, and/or the relevant third level map 330.

In some aspects, it can be determined that a third level map 340, for example, is in used based on whether the counter 326 for the corresponding entry 322 is non-zero. If any of the level three maps 340, 350, for example, referenced by the second level map 320, for example, are in use, then it can be determined that the second level map 320 is in use. If a third level map 340, 350, 360, 370 and/or a second level map 320, 330 is in use, then it should not be deallocated. For example, in the illustrated implementation, the third level maps 340 and 360 and the second level maps 320 and 330 are in use, and should not be deallocated at this moment in time. However, if a third level map 340, 350, 360, 370 and/or a second level map 320, 330 is in not use, then it should be deallocated to free up more space in memory. For example, in the illustrated implementation, the third level maps 350 and 370 are not in use, and should be deallocated. Deallocating a map from memory can include removing all information pertaining to the map, including pointers and/or counters. In some aspects, pointers which reference the prior location of a deallocated map may also be removed from memory, as the pointers may no longer be valid.

If, at a later time, the third level map 340 is no longer used, and no other entry 322 in the second level map 320 is in use at the time, then it may be determined that the second level map 320 is not in use, and it may be deallocated from memory. In some aspects, using the three-level memory mapping 300 (along with deallocation procedures) over the two-level memory mapping 200 of FIG. 2 can reduce the memory consumption of the maps by up to 90%, depending on the implementation.

The mechanisms described can be utilized to keep track of the usage/allocation of every memory location 252 in a heap memory 250 (or at least a portion thereof) and/or ensure that memory can be accessed lock free in concurrent threads. In some implementations, one or more of the counters 316, 326 can be increased to prevent parallel access to the same second level map 320, 330, the same third level map 340, 350, 360, 370, and/or the same memory location 252.

For example, if the third level map 350 previously pointed to one or more data locations 252 but is currently empty (e.g., none of the entries 352 point to a data location 252), then the corresponding counter 326 for the third level map 350 can be zero and pointer 324 can be non-zero (e.g., can still include a pointer to the third level map 350). If two separate threads attempt to deallocate the third level map 350 and add a new entry 352 to the third level map 350 at the same time, then this can cause issues. Therefore, if the thread attempting to allocate the third level map 350 sees that the counter 326 is zero and the pointer 324 is non-zero, then it can first increase the counter 326, which can stop the deallocation of the third level map 350. For example, the thread attempting to deallocate the third level map 350 can check the counter 326 and/or abort the deallocation. Once the thread allocating new entries stops, then it can change the counter 326 to the proper number.

In some implementations, as soon as all handles to all memory locations 252 addressed by a third level map 350, for example, are freed and/or all parallel accesses are finished, a corresponding counter 326 for the third level map 350 can drop to zero, and/or the whole third level map 350 can be freed. At this point the counter 316 of a corresponding second level map 320, for example, can be decreased as well. If the counter 316 drops to zero, then the corresponding second level map 320 can be freed. A procedure for decreasing counters 316, 326 and/or freeing maps can work all the way up to the first level map 310. However in some implementations, the first level map 310 may not be freed. Upon freeing the third level map 350 and/or the second level map 320, for example, the third level map 350 and/or the second level map 320 can move into a list of free maps. Maps within the free list can be reused in some implementations.

The memory mapping 300 can resolve at least some of the problems with the two-level memory mapping 200 of FIG. 2 by addressing larger memory blocks per second level map 320, 330, and/or smaller memory blocks per third level maps 340, 350, 360, 370. Additionally or alternatively, counting/tracking access to the second level maps 320, 330 and/or the third level maps 340, 350, 360, 370 can be beneficial over memory mappings which do not. If the third level maps 340, 350, 360, 370 each address 4 MB of heap memory 250, then only 4 MB of consecutive free memory locations 252 may be required to release a third level map 340, 350, 360, 370. In some aspects, the consecutive free memory locations 252 may also need to be aligned with their metadata segments in the corresponding third level map 340, 350, 360, 370. However, in some implementations, as soon as there is an 8 MB block of consecutive heap memory 250 freed (or less 7 MB, depending upon the implementation), at least one third level map 340, 350, 360, 370 can be released. Thus, in some aspects, the three-level memory mapping 300 can reduce the amount of memory required/used by the memory mapping 300 to address all (at least all used) memory locations 252 in a heap memory 250.

Addressing, allocating, and/or accessing memory according to some of the procedures described can help to reduce memory usage. Although three levels with specific sizes are illustrated in FIG. 3, in various implementations, any number of levels, sizes of each level, and/or sizes of each memory location may be possible. The number of levels and/or their sizes can depend on the size of memory (e.g., the size of the heap memory 250), and/or other factors. The illustrated implementations are only examples and are, in many aspects, over-simplifications of multi-level memory mappings. For example, in some implementations, the size of heap memory 250 addressed by each first level map, second level map, and/or third level map can be increased or decreased. Increasing the size addressed by each map can be beneficial for small increases in bits, but at some point the increase in bits can result in similar fragmentation problems that a two-level mapping 200 has. At that point, it may be possible to increase the depth of the three-level mapping 300 and introduce a level four map, a level five map, and so on. Thus, in some aspects, fragmentation problems can be resolved at the price of a performance penalty.

Figure 6:
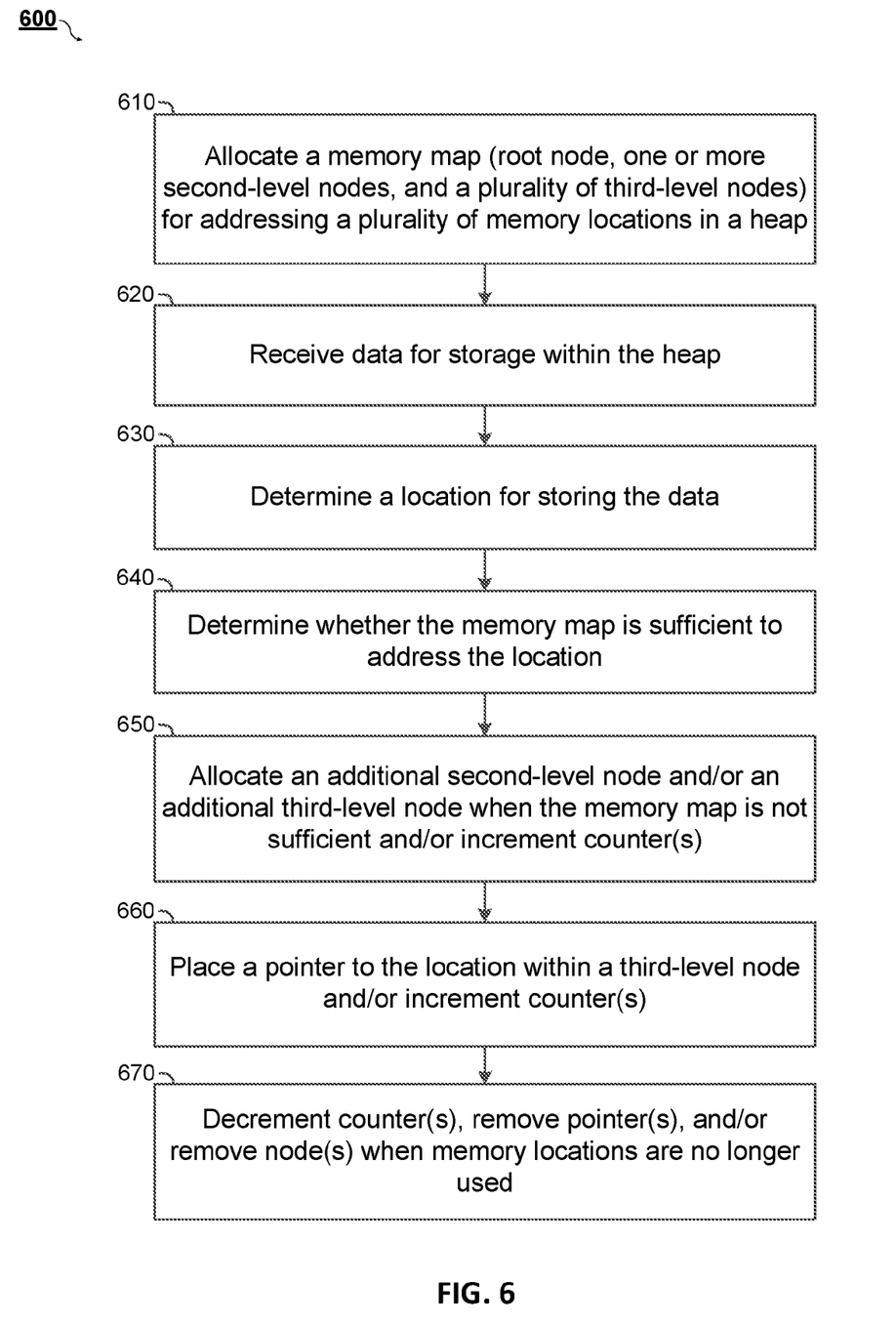
FIG. 6 illustrates a flowchart of a method for memory allocation and/or deallocation with a multi-level memory map, in accordance with some example implementations.

FIG. 6 illustrates a flowchart of a method 600 for memory allocation and/or deallocation with a multi-level memory map, in accordance with some example implementations. In various implementations, the method 600 (or at least a portion thereof) may be performed by one or more of the components and/or sub-components of the computing apparatus 100. In some aspects, the apparatus 100 may be regarded as a server (or a portion thereof), which can be in communication with other servers.

Method 600 can start at operational block 610 where the apparatus 100, for example, allocates a memory map (root node, one or more second-level nodes, and a plurality of third-level nodes) for addressing a plurality of memory locations in a heap. For example, the plurality of third-level nodes can include entries ("third entries") for pointing to the memory locations, and/or the one or more second-level nodes can include a plurality of entries ("second entries") corresponding to the plurality of third-level nodes. In some implementations, the plurality of second entries can include space for a pointer to a corresponding third-level node and/or space for a counter for a number of the third entries which are in use within the corresponding third-level node. In some aspects, the root node can comprise one or more entries ("first entries") corresponding to the one or more second-level nodes, and/or the one or more first entries include space for a pointer to a corresponding second-level node and/or space for a counter for a number of the second entries which are in use within the corresponding second-level node.

In some implementations, each of the one or more second-level nodes can address eight gigabytes of memory in the heap, each of the plurality of third-level nodes can address four megabytes of memory in the heap, and/or each of the plurality of memory locations can be four kilobytes. Other sizes for each of the nodes/locations are possible.

Method 600 can proceed to operational block 620 where the apparatus 100, for example, receives data for storage within the heap. For example, in some implementations, a program running may need to store information within the heap in order to carry out its operations. Thus, the memory map can be tasked with storing data for the program and/or keeping track of where the data is stored.

Method 600 can proceed to operational block 630 where the apparatus 100, for example, determines a location for storing the data. In some implementations, a list of free nodes can include a plurality of references to second-level nodes, third-level nodes, and/or memory locations which are not presently being used to track memory locations in the heap or store data. Determining the location to store the data within the heap can include consulting the list of free nodes.

Method 600 can proceed to operational block 640 where the apparatus 100, for example, determines whether the memory map is sufficient to address the location. For example, if the memory map currently addresses 8 GB of data, but cannot find 128 MB of concurrent data locations within the heap to store some block of information required to operate a program, then one or more additional second-level nodes and/or third-level nodes can be allocated and used to address the data (e.g., through the use of pointers), which may be stored within a portion of the heap which was not previously addressed by the memory map. In various implementations, other determinations can be made to decide whether additional nodes should be added to the memory map to address additional data locations.

Method 600 can proceed to operational block 650 where the apparatus 100, for example, allocates an additional second-level node and/or an additional third-level node when the memory map is not sufficient and/or increments counter(s). In the event that a new second-level node is allocated, then at least one new third-level node may also be allocated, and a pointer to the at least one new third-level node may be stored at the new second-level node (e.g., within a second entry). In some aspects, a counter for a second-level node can be stored at the root node which addresses the second-level node, and/or the counter may be incremented each time an additional memory third-level node is addressed/handled by the second-level node.

Method 600 can proceed to operational block 660 where the apparatus 100, for example, places a pointer to the location within a third-level node and/or increments counter(s). For example, a pointer to a data location (in the heap) which now contains at least a portion of the data can be added to one of the third entries in the third-level node. Further, in some aspects, a counter for a third-level node can be stored at a second-level node which addresses the third-level node, and/or the counter may be incremented each time an additional memory location is addressed/handled by the third-level node.

Method 600 can proceed to operational block 670 where the apparatus 100, for example, decrements counter(s), removes pointer(s), and/or removes node(s) when memory locations are no longer used. For example, the method 600 can include determining that data no longer needs to be stored within the heap, removing one or more pointers from the memory map (e.g., stored within a third-level node) corresponding to the memory locations, decrementing a counter (e.g., stored at a corresponding second-level node), and/or deallocating the third-level node when the counter reaches zero. Similarly, the method 600 can include decrementing, when a third-level node is deallocated, a second counter corresponding to the second-level node (e.g., stored at the root node), and/or deallocating the second-level node when the second counter reaches zero.

In some implementations, the method 600 can include monitoring a handle for the location, determining that the handle has been released, and/or decrementing a corresponding counter (e.g., at a second-level node).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic input, speech input, tactile input, and/or the like. Other possible input devices include touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods. In addition, the logic flows depicted in the accompanying figures and/or described herein do not necessarily require the particular order shown, or sequential order, to achieve desirable results. Other implementations may be within the scope of the following claims.

What is claimed is:

1. An apparatus comprising:
   at least one data processor; and
   at least one memory storing instructions which, when executed by the at least one data processor, result in operations comprising:
      allocating a memory map for addressing a plurality of memory locations in a heap, the memory map comprising a root node, one or more second-level nodes, and a plurality of third-level nodes, wherein the plurality of third-level nodes comprise third entries for pointing to the memory locations, wherein the one or more second-level nodes comprise a plurality of second entries corresponding to the plurality of third-level nodes;
      determining a location to store data within the heap; and
      tracking the location by placing a pointer within a third-level node of the plurality of third-level nodes and incrementing a counter corresponding to the third-level node, the counter stored within a second entry of the plurality of second entries.

2. The apparatus of claim 1, wherein the operations further comprise:
   determining that the data no longer needs to be stored;
   removing the pointer from the memory map;
   decrementing the counter; and
   deallocating the third-level node when the counter reaches zero.

3. The apparatus of claim 2, wherein the operations further comprise:
   adding, to a list of free nodes, a reference to the third-level node after the deallocating; and
   determining a second location to store second data within the heap, wherein determining the second location comprises consulting the list of free nodes.

4. The apparatus of claim 2, wherein a second-level node includes the second entry, and wherein the operations further comprise:
   decrementing, when the third-level node is deallocated, a second counter corresponding to the second-level node and stored at the root node; and
   deallocating the second-level node when the second counter reaches zero.

5. The apparatus of claim 1, wherein the operations further comprise:
   determining a second location to store second data within the heap;
   determining whether the memory map is capable of addressing the second location; and
   allocating one or more additional third-level nodes and/or one or more additional second-level nodes when the memory map is not capable of addressing the second location.

6. The apparatus of claim 5, wherein when the one or more additional third-level nodes and the one or more additional second-level nodes are allocated, the operations further comprise:
   storing, at the root node, one or more pointers to the one or more additional second-level nodes;
   incrementing, at the root node, one or more counters corresponding to the one or more additional second-level nodes;
   storing, at the one or more additional second-level nodes, one or more pointers to the one or more additional third-level nodes; and
   incrementing, at the one or more additional second-level nodes, one or more counters corresponding to the one or more additional third-level nodes.

7. The apparatus of claim 1, wherein the operations further comprise:
   monitoring a handle for the location;
   determining that the handle has been released; and
   decrementing the counter.

8. The apparatus of claim 1, wherein the plurality of second entries include space for a pointer to a corresponding third-level node and a counter for a number of the third entries which are in use within the corresponding third-level node, wherein the root node comprises one or more first entries corresponding to the one or more second-level nodes, and wherein the one or more first entries include space for a pointer to a corresponding second-level node and a counter for a number of the second entries which are in use within the corresponding second-level node.

9. The apparatus of claim 1, wherein each of the one or more second-level nodes address eight gigabytes of memory in the heap, wherein each of the plurality of third-level nodes address four megabytes of memory in the heap, and wherein each of the plurality of memory locations are four kilobytes.

10. An method comprising:
    allocating a memory map for addressing a plurality of memory locations in a heap, the memory map comprising a root node, one or more second-level nodes, and a plurality of third-level nodes, wherein the plurality of third-level nodes comprise third entries for pointing to the memory locations, wherein the one or more second-level nodes comprise a plurality of second entries corresponding to the plurality of third-level nodes;
    determining a location to store data within the heap; and tracking the location by placing a pointer within a third-level node of the plurality of third-level nodes and incrementing a counter corresponding to the third-level node, the counter stored within a second entry of the plurality of second entries.

11. The method of claim 10, further comprising:
determining that the data no longer needs to be stored;
removing the pointer from the memory map;
decrementing the counter; and
deallocating the third-level node when the counter reaches zero.

12. The method of claim 11, further comprising:
adding, to a list of free nodes, a reference to the third-level node after the deallocating; and
determining a second location to store second data within the heap, wherein determining the second location comprises consulting the list of free nodes.

13. The method of claim 11, further comprising:
decrementing, when the third-level node is deallocated, a second counter corresponding to a second-level node and stored at the root node, wherein the second-level node includes the second entry; and
deallocating the second-level node when the second counter reaches zero.

14. The method of claim 10, further comprising:
determining a second location to store second data within the heap;
determining whether the memory map is capable of addressing the second location; and
allocating one or more additional third-level nodes and/or one or more additional second-level nodes when the memory map is not capable of addressing the second location.

15. The method of claim 14, further comprising, when the one or more additional third-level nodes and the one or more additional second-level nodes are allocated:
storing, at the root node, one or more pointers to the one or more additional second-level nodes;
incrementing, at the root node, one or more counters corresponding to the one or more additional second-level nodes;
storing, at the one or more additional second-level nodes, one or more pointers to the one or more additional third-level nodes; and
incrementing, at the one or more additional second-level nodes, one or more counters corresponding to the one or more additional third-level nodes.

16. A non-transitory computer program product storing instructions which, when executed by at least one data processor, causes operations comprising:
allocating a memory map for addressing a plurality of memory locations in a heap, the memory map comprising a root node, one or more second-level nodes, and a plurality of third-level nodes, wherein the plurality of third-level nodes comprise third entries for pointing to the memory locations, wherein the one or more second-level nodes comprise a plurality of second entries corresponding to the plurality of third-level nodes;

determining a location to store data within the heap; and
tracking the location by placing a pointer within a third-level node of the plurality of third-level nodes and incrementing a counter corresponding to the third-level node, the counter stored within a second entry of the plurality of second entries.

17. The non-transitory computer program product of claim 16, wherein the operations further comprise:
determining that the data no longer needs to be stored;
removing the pointer from the memory map;
decrementing the counter;
deallocating the third-level node when the counter reaches zero;
adding, to a list of free nodes, a reference to the third-level node after the deallocating; and
determining a second location to store second data within the heap, wherein determining the second location comprises consulting the list of free nodes.

18. The non-transitory computer program product of claim 16, wherein a second-level node includes the second entry, and wherein the operations further comprise:
determining that the data no longer needs to be stored;
removing the pointer from the memory map;
decrementing the counter;
deallocating the third-level node when the counter reaches zero;
decrementing, when the third-level node is deallocated, a second counter corresponding to the second-level node and stored at the root node; and
deallocating the second-level node when the second counter reaches zero.

19. The non-transitory computer program product of claim 16, wherein the operations further comprise:
determining a second location to store second data within the heap;
determining whether the memory map is capable of addressing the second location; and
allocating one or more additional third-level nodes and/or one or more additional second-level nodes when the memory map is not capable of addressing the second location.

20. The non-transitory computer program product of claim 19, wherein when the one or more additional third-level nodes and the one or more additional second-level nodes are allocated, the operations further comprise:
storing, at the root node, one or more pointers to the one or more additional second-level nodes;
incrementing, at the root node, one or more counters corresponding to the one or more additional second-level nodes;
storing, at the one or more additional second-level nodes, one or more pointers to the one or more additional third-level nodes; and
incrementing, at the one or more additional second-level nodes, one or more counters corresponding to the one or more additional third-level nodes.

* * * * *